United States Patent Office 3,422,177
Patented Jan. 14, 1969

3,422,177
MELT ELASTIC EXTRUDER AND METHOD
Robert T. Wallace, Toledo, Ohio, assignor to Owens-Illinois, Inc., a corporation of Ohio
Filed Sept. 6, 1966, Ser. No. 577,519
U.S. Cl. 264—176    9 Claims
Int. Cl. B29b 3/02

This invention relates generally to a melt elastic extruder, and more particularly to a new and improved melt elastic extruder which is capable of providing increased quantities of extrudate.

The melt elastic extruder, while appearing to be a very useful industrial extruder, has achieved only very limited commercial success. This is due primarily to the limited capacity of the devices as well as the limited amount of extruding pressure obtained from present devices. Attempts have been made to increase the quantity and pressure of the extrudate from existing melt elastic extruders. Generally these attempts have not been particularly successful.

It is therefore an object of this invention to provide a new and improved melt elastic extruder.

It is another object of this invention to provide a melt elastic extruder capable of producing commercially acceptable extruding pressures.

Another object of this invention is to provide a melt elastic extruder of substantially increased capacity.

Figure 1:
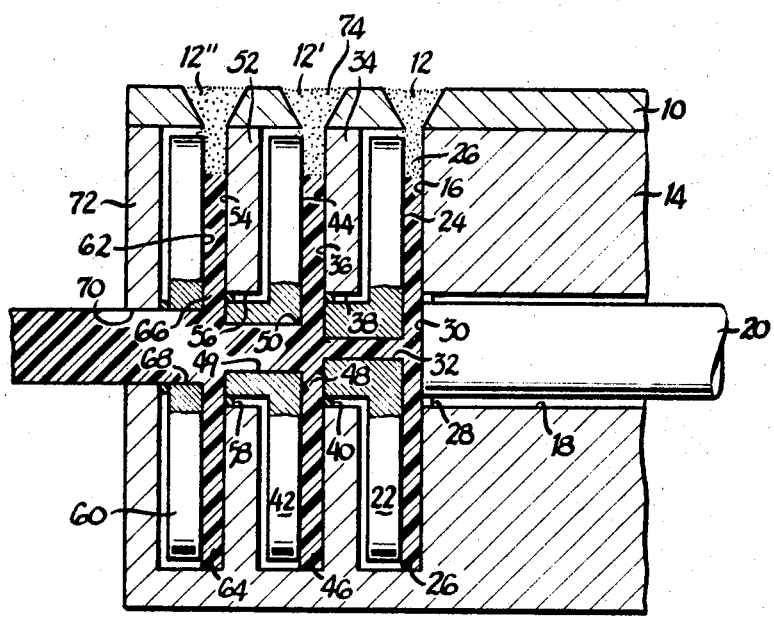
Figure 2:
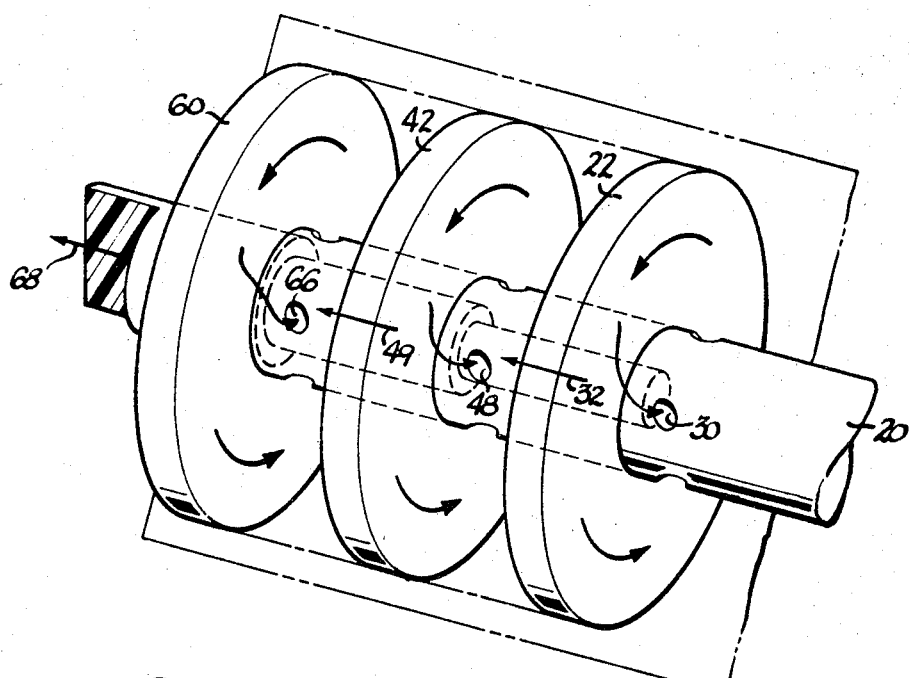

These and other objects and advantages will become apparent from a reading of the following detailed description of this invention when taken in conjunction with the accompanying drawing wherein:

FIGURE 1 is a cross-sectional view in elevation of the melt elastic extruder of this invention; and FIGURE 2 is a perspective view of part of the extruder of FIGURE 1.

Referring now to the drawing, reference numeral 10 denotes the housing for the melt elastic extruder of this invention. The housing 10 is provided with a plurality of openings 12 through which thermoplastic material in powdered or pellet form may be fed. A stationary plate member 14 is positioned within the housing 10 and it is provided with a flat plate surface 16 and an axial bore 18.

A drive shaft 20 is positioned within the bore 18 and extends axially thereof. The drive shaft 20 is connected to a conventional power source (not shown) such as a hydraulic motor capable of rotating the shaft at the desired and conventional speeds. A rotating plate member 22 is formed integrally with or fixedly secured to the drive shaft. The plate member 22 is provided with a rotating plate face 24 which is in spaced relationship to the fixed plate surface 16, defining therebetween a radial channel 26. The channel 26 is linear and it is substantially perpendicular to the axis of rotation of the drive shaft 20. It is in open communication with the openings 12 in the housing 10.

A bushing 28 of suitable material is provided around the drive shaft 20 and in alignment with plate surface 16 to prevent any plastic material in the channel 26 from escaping around the drive shaft. The drive shaft 20 is provided with a radial bore 30 in alignment and in open communication with the radial channel 26. It is also provided with an axial channel 32 which is in open communication with the radial bore 30.

A second fixed plate member 34 is positioned within the housing 10 intermediate opening 12' and rotating plate member 22. The second fixed plate member 34 is spaced from rotating plate member 22 and it is provided with a plate surface 36 and an axial bore 38. The drive shaft 20 extends through axial bore 38 and it is surrounded by a bushing 40 positioned at or near plate surface 36.

A second rotary plate member 42 is formed integrally with the drive shaft 20 or fixedly secured thereto. The second rotary plate member 42 is provided with a rotary plate surface 44 which surface is spaced from fixed plate surface 36 to provide therebetween a second radial melting channel 46 which is in open communication with feed opening 12'. The drive shaft 20 is provided with a second radial bore 48 which at either end is in open communication with the radial channel 46. Intermediate either end, the radial bore 48 is in open communication with the axial bore 32. The diameter of axial bore 32 is increased, as at 50, which increased diameter portion continues through the drive shaft 20 downstream of the radial bore 48 to provide an enlarged axial bore portion 49.

Also provided in the housing 10, is a third fixed plate member 52 which is rigidly positioned in the housing and spaced from the second rotary plate member 42. The third fixed plate member 52 is provided with a fixed plate surface 54 and an axial bore 56 through which the drive shaft 20 extends. The axial bore 56 is sealed at plate surface 54 by a bushing 58. A third rotary plate member 60 is spaced from the fixed plate member 52 and it is provided with a rotary plate surface 62 spaced from fixed plate surface 54 to provide therebetween a third radial melting channel 64 which is in open communication with feed opening 12".

The third rotary plate member is formed integrally with or fixedly secured to the drive shaft 20 which drive shaft 20 is provided with a third radial bore 66 in vertical alignment with the radial channel 64. The radial bore 66 is in open communication with enlarged axial bore portion 49 on the upstream side and with a further enlarged axial bore portion 68 on the downstream side.

The enlarged bore portion 68 is in open communication with the opening 70 in the housing end plate 72 which opening 70 is axially aligned with the drive shaft 20. The opening 70 may be placed in communication with any desired thermoplastic molding equipment (not shown) to receive the plastic material being extruded from the melt elastic extruder of this invention.

In operation, thermoplastic pellets or powder 74 are fed into the extruder of this invention through feed openings 12, 12' and 12". The feed of these pellets 74 may be by gravity as is shown or by various feed devices previously suggested by those skilled in the art. The motor (not shown) connected to the drive shaft 20 is started to rotate the drive shaft and its attached rotary plate members 22, 42 and 60. Relative rotation between these rotary plate members 22, 42 and 60 and fixed plate members 14, 34 and 52 advances the plastic material 74 centripetally through the radial channels 26, 46 and 64, respectively, toward the axis of rotation of the drive shaft 20.

The plastic material 74 in the radial channels 26, 46 and 64 is also sheared between the respective fixed and rotating plate surfaces which creates sufficient heat to melt the plastic material 74 as it is fed toward the axis of rotation of the drive shaft 20. The centripetal force exerted on the plastic material 74 forces the same into radial bore 30 from channel 26, radial bore 48 from channel 46 and radial bore 66 from channel 64. The plastic material from bore 30 proceeds downstream through axial channel 32 where it joins the plastic material in radial bore 48. Thereafter, the two joined streams proceed through enlarged bore portion 49 where they join the plastic material in radial channel 66.

The plastic material then is forced through the second enlarged bore portion 68 and through the opening 70. Sufficient pressure and quantity of plastic material is thus obtained for commercial operations. If desired, an auger may be provided in the opening to increase the pressure on the molten plastic material as it is extruded from the melt elastic extruder of this invention.

While the preferred embodiment of this invention has been described it should be understood that various modifications may be made in the same without departing from the spirit and scope of this invention as set forth in the following claims.

I claim:

1. A melt elastic extruder comprising a housing, a plurality of fixed plates in said housing, a plurality of rotatable plates in said housing, each of said rotatable plates being separated from each other by one of said fixed plates to define a melting channel between each pair of fixed plates and rotatable plates, means for feeding particulate thermoplastic material into each of said melting channels, a common rotatable shaft for said rotatable plates and coaxial therewith, said shaft extending coaxially through said fixed plates, said shaft having an axial hollow bore and a plurality of radial bores in open communication with said axial bore, each of said radial bores being in open communication with a melting channel, means for rotating said shaft and an opening in said housing coaxial with said axial bore.

2. A melt elastic extruder according to claim 1 wherein three fixed and three rotatable plates are provided.

3. A melt elastic extruder according to claim 1 wherein said rotatable plates, said fixed plates and said radial bores are equal in number.

4. A melt elastic extruder according to claim 1 wherein said axial bore increases in diameter at each successive melting channel.

5. A melt elastic extruder according to claim 1 wherein said axial bore gradually increases in diameter from said first melting channel in the direction of said opening.

6. A melt elastic extruder comprising a plurality of fixed plates in spaced parallel relation to each other, a plurality of rotatable plates each separated from the others by one of said fixed plates to provide adjacent pairs of fixed and rotatable plates, each said pair of fixed and rotatable plates defining a melting channel between the same, means for feeding thermoplastic material to each of said melting channels, drive means connected to said rotatable plates for rotating the same simultaneously, and bores providing a common outlet and a passage for flow of plasticized material from said melting channels to said common outlet.

7. A melt elastic extruder comprising a plurality of fixed plates in spaced parallel relation to each other, a plurality of rotatable plates interleaved with said fixed plates and each separated from the others by one of said fixed plates to provide adjacent pairs of fixed and rotatable plates, each pair of fixed and rotatable plates defining a melting channel between the same, means for feeding thermoplastic material into each of said melting channels, a rotatable shaft connected to each of said rotatable plates for rotating the same simultaneously, said shaft extending coaxially through said fixed plates, and said shaft having a hollow axial bore therein and a plurality of radial bores in open communication with said axial bore, each of said radial bores being in open communication with a respective one of said melting channels, and said axial bore providing a passage common to said melting chambers for collecting plasticized material from said melting chambers for flow out of said extruder.

8. A method of extruding thermoplastic material comprising feeding thermoplastic material into a plurality of melting channels defined between pairs of fixed and rotatable shearing members, flowing said material in streams through said melting channels by relative rotation of said fixed and rotatable shearing members, and combining said streams of flowing thermoplastic material in a passage extending axially through said fixed and rotatable shearing members and in open communication with said melting channels for flow to a common outlet for said melting channels.

9. The method of claim 8 in which said streams are combined sequentially as said material flows along said passage.

References Cited

UNITED STATES PATENTS

| | | | |
|---|---|---|---|
| 3,213,808 | 10/1965 | Schafer | 18—13 |
| 3,295,165 | 1/1967 | Wallace | 264—176 |
| 3,351,694 | 11/1967 | Curto et al. | 264—176 |
| 3,365,750 | 1/1968 | Donald | 18—13 |

ROBERT F. WHITE, *Primary Examiner.*

G. AUVILLE, *Assistant Examiner.*

U.S. Cl. X.R.

18—12, 13